United States Patent [19]
Kurcbart

[11] Patent Number: 4,977,614
[45] Date of Patent: Dec. 11, 1990

[54] WRISTBAND WITH LOOP ANTENNA

[75] Inventor: Robert Kurcbart, Boca Raton, Fla.

[73] Assignee: Motorola, Inc., Schaumburg, Ill.

[21] Appl. No.: 425,095

[22] Filed: Oct. 23, 1989

[51] Int. Cl.[5] H04B 1/18

[52] U.S. Cl. 455/193; 455/274; 455/351; 340/825.44; 343/718; 368/10; 368/282

[58] Field of Search 455/344, 346, 351, 193, 455/228, 274; 340/311.1, 825.44; 368/10, 282, 281, 278; 343/744, 718, 866, 867, 868, 869, 870

[56] References Cited

U.S. PATENT DOCUMENTS 1,326,934 11/1920 Hulburd 368/281
3,032,651 5/1962 Stahli et al. .
3,478,344 11/1969 Schwitzgebel et al. .
3,983,483 9/1976 Pando .
4,006,587 2/1977 Huguenin 368/281
4,178,751 12/1979 Liautaud 368/281
4,419,770 12/1983 Yagi et al. .
4,625,212 11/1986 Oda et al. 343/744
4,713,808 2/1987 Caskill et al. 370/94
4,754,285 6/1988 Robitaille 343/868
4,769,656 9/1988 Dickey 455/351
4,817,196 3/1989 MacNak et al. 455/193
4,873,527 10/1989 Tan 343/718

FOREIGN PATENT DOCUMENTS 83304287.2 7/1983 European Pat. Off. .

*Primary Examiner*—Reinhard J. Eisenzopf
*Assistant Examiner*—Lisa Charouel
*Attorney, Agent, or Firm*—William E. Koch; Vincent B. Ingrassia

[57] ABSTRACT

An apparatus for adjusting the length of a single segment loop antenna while automatically compensating for the antenna so as to maintain a substantially constant resonant frequency thereof.

10 Claims, 2 Drawing Sheets

90 94 54 52 102 28 104 30 32 42 46 40 92 106 72 44

SECTION 10-10

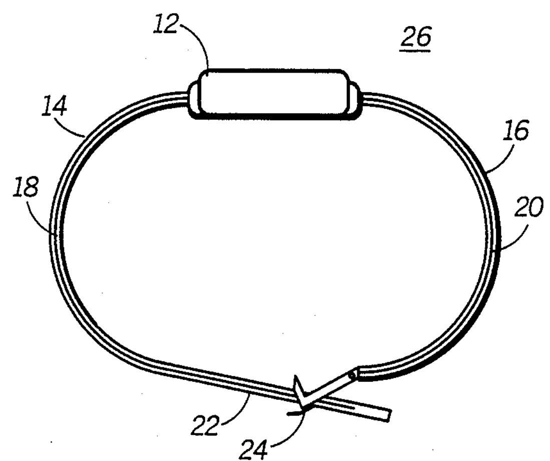
FIG. 1
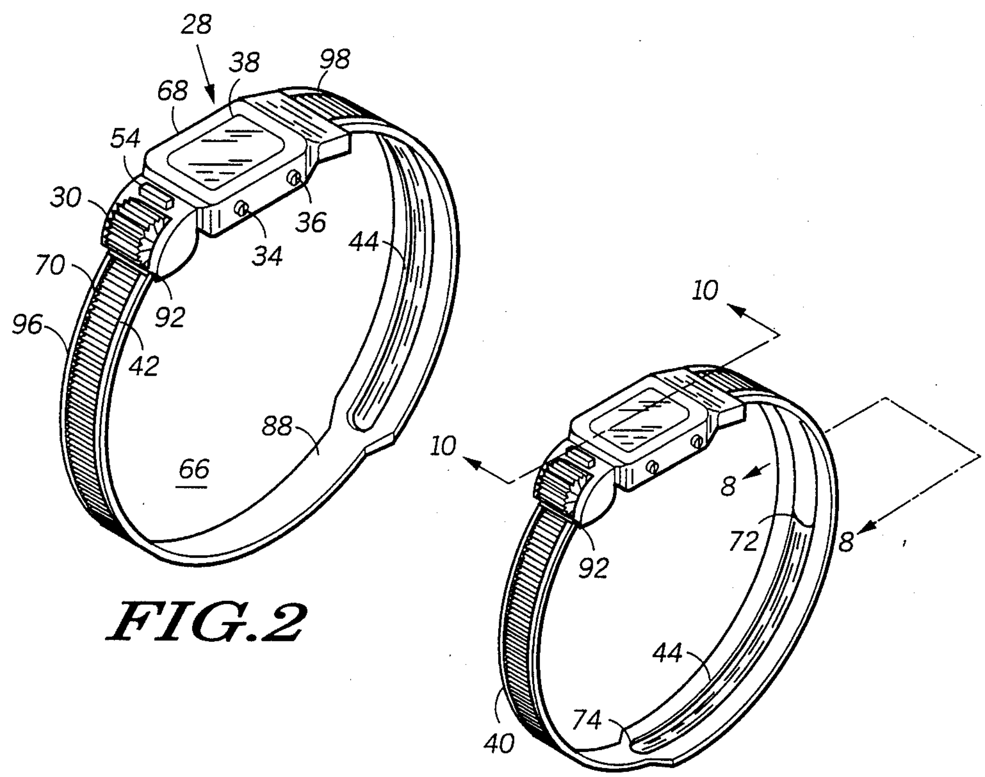
FIG. 2
FIG. 3

WRISTBAND WITH LOOP ANTENNA

FIELD OF THE INVENTION

This invention relates in general to the field of selective call receivers and more particularly, to a wrist worn selective call receiver including a wristband incorporating an adjustable antenna having a substantially constant resonant frequency.

BACKGROUND OF THE INVENTION

As selective call receivers (such as pagers) have become smaller, it has become possible to package the electronics so that they can be comfortably worn on a user's wrist. Antennas used with these wrist worn receivers have often utilized a simple, single-turn loop antenna incorporated into the wristband of the device. Rivets, or similar fasteners, have been used to provide a series of regularly spaced openings in one of the wristband sections to accommodate the varying sizes of the human wrist. This also provided the electrical connection to close the loop when the wristband was fastened to the wrist.

Since a loop antenna's inductance is dependent upon its physical geometry (antenna diameter or length), the tuning of such a loop antenna varied with the wrist size. Consequently, substantial changes in the antenna's resonant frequency and changes in the corresponding receiver sensitivity resulted when the user adjusted the wristband for a comfortable fit. As a consequence, factory pre-tuning of such a wristband loop antenna was not possible. Skilled technicians were required to tune the antennas on the devices as they were being sold. Even after tuning the antenna properly, the device would malfunction if the user was inconsistent in strapping the device to the wrist.

Referring to FIG. 1, a typical prior art wristband loop antenna arrangement 26 generally used a non-stretchable, two-piece wristband. The receiver is located in a housing 12 to which two non-stretchable straps 14 and 16 are attached. Within each strap 14 and 16 is located an antenna 18 and 20, respectively. The antenna may be of various geometries although the typical shape is a flat, rectangular conductive wire or band. Attached to one end of the wristband strap 16 is a conventional buckle 24, which connects to one end of the antenna 20. In the other wristband strap 14, a series of regularly spaced holes are provided on a surface 22 to allow for adjustment of the wristband length. An eyelet (not shown) is often inserted into each of the holes to provide electrical connection with the antenna 18 within the strap 14.

Other antenna structures have also been proposed for use in wrist worn receivers although all have exhibited similar tuning problems. That is, as the geometry of the antenna loop was changed during adjustment, detuning of the antenna would occur. Also, reduced receiver sensitivity would result depending on the position of the wrist.

Thus, what is needed is a method of incorporating a loop antenna within an adjustable, flexible wristband that remains tuned, regardless of the position worn on the wrist.

SUMMARY OF THE INVENTION

Accordingly, it is an object of the present invention to provide an improved a selective call receiver.

In carrying out the above and other objects of the invention in one form, there is provided a method comprising the step of adjusting the length of a single segment loop antenna while automatically compensating for the antenna so as to maintain a substantially constant resonant frequency thereof.

BRIEF DESCRIPTION OF THE DRAWINGS

FIG. 1 is a side view of a prior art wrist worn device utilizing a wristband loop antenna.

FIG. 2 is a perspective view of the preferred embodiment of the present invention in a fully open position.

FIG. 3 is a perspective view of the preferred embodiment of the present invention in a partially open position.

DETAILED DESCRIPTION OF THE INVENTION

Figure 4:
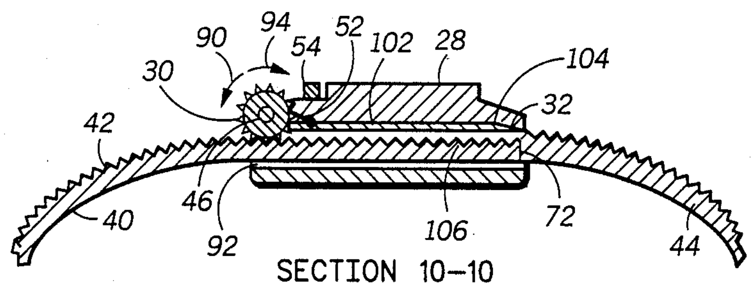
FIG. 4 is a cross sectional view of the wristband taken along line 10—10 of FIG. 3.

Referring to FIG. 2, a selective call receiver 28 is shown having a wristband 40 in the fully open position, to facilitate placing the selective call receiver on the user's wrist. The selective call receiver 28 comprises a housing 68, a display 38, controls 34 and 36, a spur gear wheel 30, and a detent actuator 54. The size of the display 38, the number of controls 34 and 36, and the material of the wristband 40 may vary without deviating from the intent of the invention. The housing 68 preferably includes a slot 92 for slideably engaging the wristband 40. The wristband 40 comprises a single piece of plastic, in the preferred embodiment, with a slot 44 molded along an inner surface 88 and an antenna 42 formed in the shape of a gear rack and assembled to an outer surface 70 of the wristband 40. The gear rack antenna 42 may cover a portion of the surface 70 or the entire surface 70. To prevent the wristband 40 from completely disengaging from the housing, a non-reversible tab 32 is placed contiguous to a first end 72, which functions as a stop feature. The stop feature is not necessary in the operation of the present invention but prevents the user from becoming frustrated should the end 72 disengage with the wheel 30 on a frequent basis.

Referring to FIG. 3, the wristband 40 is shown in a partially open position. To do this, the wristband 40 is adjusted so that the first end 72 is slideably engaged with the slot 92 in the housing 68 and the slot 44 in the wristband 40. The wristband 40 is in a fully closed position when the end 72 of the wristband 40 is contiguous to a second end 74 of the slot 44. In the preferred embodiment, the slot 44 comprises substantially half the length of the wristband 40 although the length of the slot 44 may comprise the entire length so as to accommodate the majority of human wrist sizes. This allows the wristband 40 to be manufactured in one length as opposed to conventional wristbands that are manufactured in various sizes.

Referring to FIG. 4, a cross sectional view of the selective call receiver 28 is taken along the line 10—10 of FIG. 3. As is shown, the antenna 42 of the wrist band 40 is slideably engaged with the spur gear surface 76 of the wheel 30. By rotating the wheel 30 in a clockwise direction 94 or counter-clockwise direction 90, the user can adjust the wristband 40 to accommodate most wrist sizes. The wheel 30 is rotated in the counter-clockwise direction 90, by the user's thumb, for example, to tighten the wristband 40, and loosened by rotating the wheel 30 in the clockwise direction 94. The wristband 40 is in the fully open position (FIG. 2) when the tab 32 contacts the wheel 30, preventing the wheel from rotating further in the clockwise direction 94. Rotating the wheel 30 in the counter-clockwise direction 90 results in the wristband 40 slideably engaging the slot 44. In the preferred embodiment, the wheel 30 may be rotated in the counter clockwise direction 90 until the end 72 of the wristband 40 is contiguous to the end 74 (FIG. 3) of the slot 44.

According to the invention, the antenna 42 is assembled to the outer surface 70 of the wristband 40 and engages the wheel 30. Therefore, adjusting the length of the wristband 40 will consequently adjust the length of the antenna 42. An electrical closed loop circuit is comprised by the antenna 42, a printed circuit board 102, and the wheel 30 which contains the capacitor 46. The closed loop circuit is maintained regardless of the position of the wristband 40 in the normal adjustment range. This is accomplished since the antenna 42, the printed circuit board 102, and the wheel 30 are connected at all times. The antenna 30 is attached at one end 104 to the printed circuit board 102, which is contiguous to the wheel 30. The electrical circuit is completed by a contact 52, which is contiguous to the wheel 30 and the printed circuit board 102. A variable tuning capacitor 46 is placed substantially within the wheel 30, the capacitor 46 being in series with the antenna circuit. The capacitor will vary accordingly as the length of the wristband 40 varies, regardless of its adjusted size, so as to provide a substantially constant resonance frequency.

Figure 5:
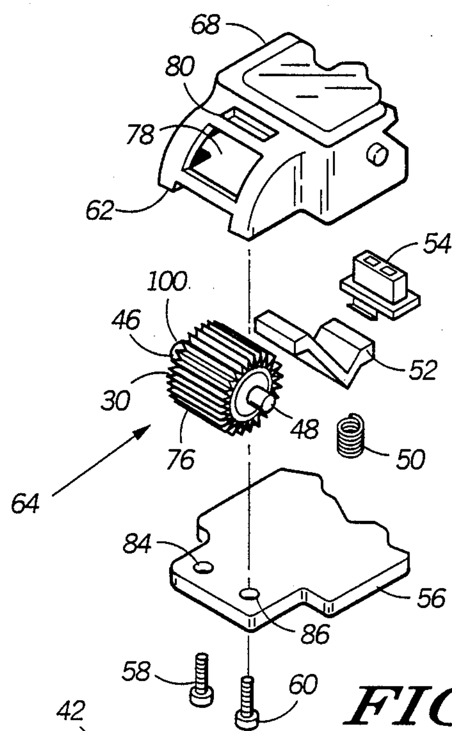
FIG. 5 is a break out of a perspective view of a portion of the preferred embodiment of the present invention.

Referring to FIG. 5, a mechanism 64 that adjusts the wristband 40 comprises the wheel 30, a detent 50, the contact 52, and the actuator 54. The mechanism 64 fits substantially within the housing 68 of the selective call receiver 28. The wheel 30 fits within an opening 78 and the actuator 54 fits within an opening 80, thereby exposing both the wheel 30 and the actuator 54 to the user for adjusting the length of the wristband 40. The wheel 30 includes the spur gear surface 76 for engaging a first end 82 of the contact 52. The variable capacitor 46 is placed within the wheel 30, having one end 48 substantially fixed and a second end 100 substantially free to move. The mechanism 64 is used in the preferred embodiment to modify the length of the wristband 40 but another type mechanism may be used without varying from the intent of the invention. A back cover 56 encloses the mechanism 64 within the housing 68 and is contiguous to a surface 62. Fasteners 58 and 60 are placed through openings 84 and 86 of the back cover 56 and engaged with openings (not shown) in the surface 62 of the housing 68. Thus, the wristband 40 may be continuously adjusted with the mechanism 64 while the resonance frequency of the antenna 42 remains substantially constant.

Figure 6:
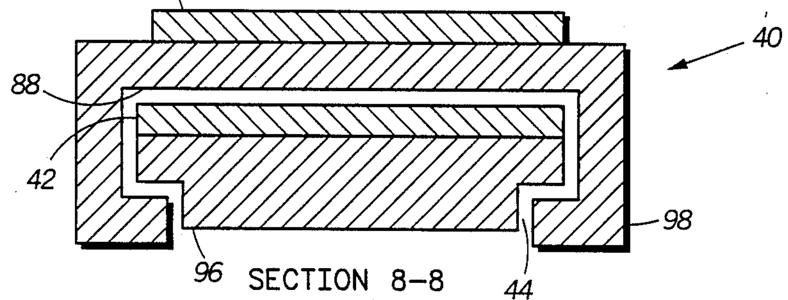
FIG. 6 is a cross sectional view of the wristband taken along line 8—8 of FIG. 3.

Referring to FIG. 6, the cross sectional view of the wristband 40 is taken along the line 8—8 of FIG. 3. The antenna 42 is assembled to the outer surface 70 of the wristband 40 and slideably engages the slot 44 with the gear rack antenna 42 contiguous to the inner surface 88 of the slot 44. The slot 44 allows the wristband 40 to be adjusted to a larger or smaller configuration without the user being aware of the sliding action of the wristband 40. In the preferred embodiment, the slot 44 is molded substantially within the inner surface 88 of a first half 96 (FIG. 2) of the overall length of the wristband 40. The gear rack antenna 42 is molded onto the outer surface 70 of a second half 98 (FIG. 2) of the wristband 40. The length of the slot 44 and the gear rack antenna 42 may comprise a variety of lengths relative to the wristband 40 without compromising from the intent of the invention.

I claim:

1. An apparatus comprising:

a radio receiver disposed in a housing having a band suitable for attaching to an object;

an antenna having a substantially constant resonant frequency said antenna comprising a gear rack positioned contiguous to said band; and adjusting means for adjusting the length of said antenna, said adjusting means being positioned contiguous to said apparatus and to said antenna and comprising a spur gear wheel mechanism for engaging said antenna.

2. The apparatus according to claim 1 wherein said band comprises first and second ends, said first end comprising a tab for preventing said band from disengaging said spur gear wheel mechanism and said second end of said band coupled to said receiver.

3. The apparatus according to claim 1 wherein said band comprises first and second surfaces, said first surface comprising a slot substantially along the length of said band for slideably engaging said first end of said band, said second surface comprising said antenna positioned contiguous to said band.

4. A selective call receiver comprising:

receiver means disposed in a housing having a band suitable for attaching to an object;

antenna means disposed in said band and coupled to said receiver means, said antenna means comprises a gear rack; and adjustment means for adjusting said band so as to fasten said receiver means to a wrist, said antenna means having a substantially constant resonant frequency, said adjustment means comprises a spur gear wheel mechanism for engaging said antenna means, thereby forming a closed loop electrical circuit.

5. The selective call receiver according to claim 4 wherein said receiver means comprises a slot for slideably engaging said band.

6. The selective call receiver according to claim 4 wherein said band comprises first and second ends, said first end comprising a tab and said second end coupled to said receiver means.

7. The selective call receiver according to claim 6 wherein said band comprises first and second surfaces, said first surface comprising a slot substantially along the length of said band for slideably engaging said first end of said band, said second surface comprising said antenna means positioned contiguous to said band.

8. An apparatus comprising:

a radio receiver disposed in a housing having a band suitable for attaching to an object;

an antenna having a substantially constant resonant frequency, said antenna positioned contiguous to said band; and manually rotatable adjustment means for adjusting the length of said antenna; and for maintaining said substantially constant resonant frequency of said antenna, said manually rotatable adjustment means being positioned contiguous to said apparatus and to said antenna and comprising a mechanism for engaging said antenna.

9. The apparatus according to claim 8 wherein said antenna comprises a gear rack.

10. The apparatus according to claim 8 wherein said mechanism comprises a spur gear wheel.

* * * * *